July 9, 1963 H. VOLKERS ETAL 3,097,344

AMPLIFYING ARRANGEMENT FOR A PLURALITY OF INPUT SIGNALS

Filed Dec. 18, 1961 2 Sheets-Sheet 1

INVENTOR
HENDRIK VOLKERS
EMIL G.F. VAN DER LINDEN
JAAP STARREVELD
BY Frank R. Jifari
AGENT July 9, 1963 H. VOLKERS ETAL 3,097,344

AMPLIFYING ARRANGEMENT FOR A PLURALITY OF INPUT SIGNALS

Filed Dec. 18, 1961 2 Sheets-Sheet 2

INVENTOR
HENDRIK VOLKERS
EMIL G.F. VAN DER LINDEN
JAAP STARREVELD
BY [signature]
AGENT 3,097,344
Patented July 9, 1963

3,097,344

AMPLIFYING ARRANGEMENT FOR A PLURALITY OF INPUT SIGNALS

Hendrik Volkers, Emil van der Linden, Franciscus Gijsbertus, and Jaap Starreveld, all of Hilversum, Netherlands, assignors to North American Philips Company, Inc., New York, N.Y., a corporation of Delaware Filed Dec. 18, 1961, Ser. No. 159,902
Claims priority, application Netherlands Jan. 16, 1961
3 Claims. (Cl. 330—30)

The invention relates to an amplifying arrangement for the amplified and combined reproduction of three input signals. Such an amplifying arrangement may be used in a communication system for instance on board of an airplane in which it is required that a first input signal A reaches a first output circuit but not a second output circuit, a second input signal B reaches this second output circuit but not the first output circuit, and a third input signal C reaches both the first and the second output circuit. It may also be desired that the input signals A and B and, as the case may be, the input signal C should be reproduced in a third output.

The present invention enables these requirements to be satisfied in a simple manner. It is characterized in that the first input signal is applied only to the base of a first transistor operating in common collector arrangement, that the second input signal is applied only to the base of a second transistor operating in common collector arrangement, and that the third input signal is applied to the bases of the first and second transistors, and the combination of the first and third signals is taken from the emitter of the first transistor, the combination of the second and third signals is taken from the emitter of the second transistor, and the combination of at least the first and second signals is derived from the potential difference betwen the two emitters of the transistors.

The invention is based on the recognition that, owing to the fact that the emitter input impedance of a transistor amplifier operating as a common collector circuit is very small, the voltage at the emitter of the transistor is substantially equal to the signal applied to the base of the transistor. Thus, although a difference signal is produced across the connection between the two emitters of the transistors which corresponds to the difference between the voltages applied to the bases of these transistors, the signal currents flowing through this connection have negligible cross-talk to the output circuits connected to the emitters. Furthermore, the input impedances of the transistors when operating as common collector circuits are so high that cross-talk of the first and second signals to the bases of the transistors by way of the source providing the third signal is substantially avoided. The use of the common collector arrangement also has the advantage that the output impedances may vary considerably without the voltages across the output transformers being greatly varied.

Figure 1:
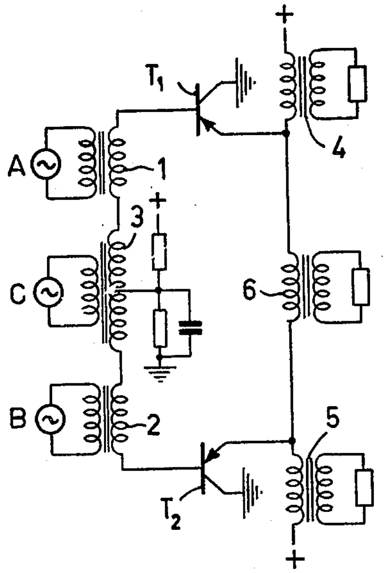
Figure 2:
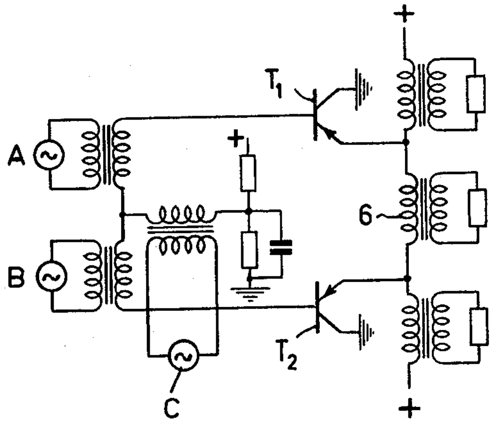
Figure 3:
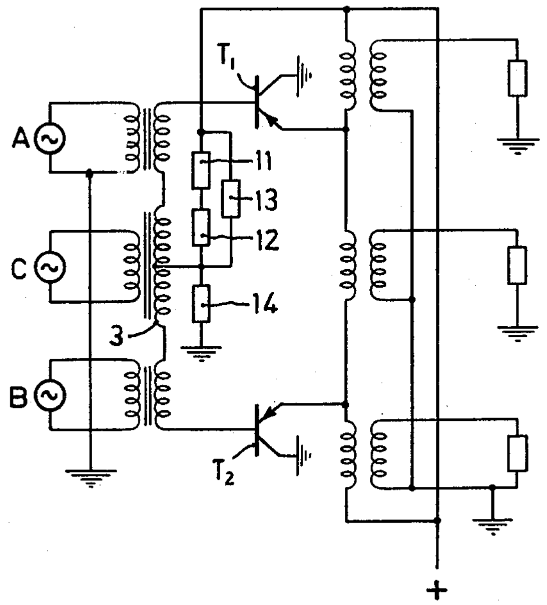

In order that the invention may readily be carried into effect, it will now be described, by way of example, with reference to the accompanying diagrammatic drawings, in which:

FIGURES 1 and 2 are two different block-schematic diagrams of circuit arrangements in accordance with the invention, and FIGURE 3 shows a more elaborate circuit arrangement according to the principle of FIGURE 1.

In FIGURE 1, there are three separate input signal sources A, B and C. The signals of these sources are applied to two transistors $T_1$ and $T_2$, the circuit arrangement being such that the signals A and C appear at a first pair of output terminals, the signals B and C appear at a second pair of output terminals, and the signals A, B and C appear at a third pair of output terminals. For this purpose, the transistors $T_1$ and $T_2$ operate as common collector circuits that is to say, the collector of the transistor is common to the input and output circuits. Furthermore, the signals of the source A are applied to the base of the transistor $T_1$ only, the signals of the source B are applied to the base of the transistor $T_2$ only, the signals of the source C being applied both to the base of the transistor $T_1$ and to the base of the transistor $T_2$. Thus, both the signal A and the signal C are produced at the emitter of the transistor $T_1$, both the signal B and the signal C being produced at the emitter of the transistor $T_2$. Owing to the fact that the signal of the source C is applied in phase opposition to the bases of the transistors $T_1$ and $T_2$, the combination of the signals A, B and C can be derived from the potential difference between the two emitters.

In FIGURE 1 the last-mentioned signal is taken from a coupling transformer 6. Although in this manner a direct connection is established between the emitters of the transistors $T_2$ and $T_1$, no cross-talk of the signal B will occur to an output transformer 4 for the signals A and C nor will cross-talk of the signal A occur to an output transformer 5 for the signals B and C, because the emitter input impedances of the transistors $T_1$ and $T_2$ are negligible compared with the impedance of the transformer 6 between the two emitters.

The sources A, B and C may have an internal resistance of, say, 5 ohms. Transformers 1, 2 and 3 have transformation ratios of, say, 1:2 so that in the base circuits of the transistors $T_1$ and $T_2$ resistances of about 40 ohms are operative. When using transistors of the type OC28, the emitter input resistance of the transistors does not exceed 1 ohm. Output transformers 4, 5 and 6 have transformation ratios of, say, 2:1 and are connected to output impedances of, say, 50 ohms, so that the primaries of the transformers 4, 5 and 6 have internal resistances of 200 ohms.

Furthermore the base input impedances of the transistors $T_1$ and $T_2$ are high compared with the impedances connected in the base circuits. With the above-mentioned numerical values the base input impedance is, say, 5000 ohms, whereas the impedances of the secondaries of the input transformers are only 20 ohms. Thus, only a very small part of the voltage of the signal A across the secondary of the transformer 1 will be set up across one-half of the transformer 3. Cross-talk of this signal A to the base of the transistor $T_2$ and conversely cross-talk of the signal B to the base of the transistor $T_1$ consequently is extremely slight. It may even compensate to a greater or lesser extent for the first-mentioned cross-talk. Hence, a cross-talk level of −47 db can be obtained.

If, as is shown in FIGURE 2, the signal C is applied to the two bases of the transistors $T_1$ and $T_2$ in phase, only the combination of the signals A and B will be produced at the output transformer 6. This may be of importance if a loudspeaker constituting the load of this output transformer 6 is disposed in the proximity of a microphone amplifier constituting the signal source C. Thus, no acoustic feedback can occur.

In the more elaborate embodiment shown in FIGURE 3, the circuit components are chosen as follows: internal resistances of the sources A, B and C and of the loads connected to the output transformers, and the transformation ratios as described hereinbefore. Transistors $T_1$ and $T_2$ of the type OC28 operated with an emitter voltage of 24 volts and connected to a common base bias voltage divider comprising a negative temperature coefficient resistor 11 of 50 ohms and resistors 12, 13 and 14 of slight temperature dependence of 27 ohms, 100 ohms and 330 ohms respectively. The amplification obtained was 34 db, the cross-talk ratio was −40 db.

In order to increase the energy amplification, the transistors $T_1$ and $T_2$ may be obviously each be replaced by a system of interconnected transistors which corresponds to a single transistor having an increased current amplification factor.

What is claimed is:

1. An amplifying arrangement for the amplified and combined reproduction of three input signals, characterized in that the first input signal is applied only to the base of a first transistor operating in common collector arrangement, that the second input signal is applied only to the base of a second transistor operating in common collector arrangement, and that the third signal is applied both to the base of the first transistor and to that of the second transistor, and the combination of the first and third signals is taken from the emitter of the first transistor, the combination of the second and third signals is taken from the emitter of the second transistor, and the combination of at least the first and the second signals is taken from the potential difference between the two emitters of the transistors.

2. A circuit arrangement as claimed in claim 1, characterized in that the third signal is applied in phase opposition to the two bases of the transistors and the combination of the three signals is taken from the potential difference between the two emitters.

3. A circuit arrangement as claimed in claim 1, characterized in that the third signal is applied in phase to the bases of the two transistors so that the potential difference produced between the two emitters contains the first and second signals only.

No references cited.